US009473700B2

(12) United States Patent
Cossairt et al.

(10) Patent No.: US 9,473,700 B2
(45) Date of Patent: Oct. 18, 2016

(54) CAMERA SYSTEMS AND METHODS FOR GIGAPIXEL COMPUTATIONAL IMAGING

(75) Inventors: Oliver S. Cossairt, New York, NY (US); Daniel Miau, Scarsdale, NY (US); Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 545 days.

(21) Appl. No.: 13/883,543

(22) PCT Filed: Nov. 3, 2011

(86) PCT No.: PCT/US2011/059100
§ 371 (c)(1),
(2), (4) Date: Dec. 23, 2013

(87) PCT Pub. No.: WO2012/061571
PCT Pub. Date: May 10, 2012

(65) Prior Publication Data
US 2014/0111606 A1    Apr. 24, 2014

Related U.S. Application Data

(60) Provisional application No. 61/409,865, filed on Nov. 3, 2010, provisional application No. 61/450,315, filed on Mar. 8, 2011.

(51) Int. Cl.
| H04N 5/232 | (2006.01) |
| H04N 5/225 | (2006.01) |
| G02B 7/02 | (2006.01) |
| G02B 13/06 | (2006.01) |
| G02B 27/00 | (2006.01) |
| G02B 3/00 | (2006.01) |
| G03B 37/04 | (2006.01) |

(52) U.S. Cl.
CPC ............ *H04N 5/23238* (2013.01); *G02B 3/00* (2013.01); *G02B 7/027* (2013.01); *G02B 13/06* (2013.01); *G02B 27/0025* (2013.01); *G03B 37/04* (2013.01); *H04N 5/2254* (2013.01)

(58) Field of Classification Search
CPC .......... H04N 5/23232; H04N 5/2621; H04N 5/23238; H04N 5/2254; G02B 13/06; G02B 3/00; G02B 27/0025; G02B 7/027; G03B 37/04
See application file for complete search history.

(56) References Cited

U.S. PATENT DOCUMENTS 5,004,328 A * 4/1991 Suzuki ................... G02B 3/00
348/E5.027
5,206,499 A    4/1993 Mantravadi et al.
(Continued)

OTHER PUBLICATIONS

Krishnan et al., "Towards a True Spherical Camera," SPIE-IS&T Electronic Imaging vol. 7240, published Jan. 28, 2009.*
(Continued)

*Primary Examiner* — Dennis Hogue
(74) *Attorney, Agent, or Firm* — Byrne Poh LLP

(57) ABSTRACT

Camera systems and methods for gigapixel computational imaging are provided. In some embodiments, the camera system comprises: a ball lens, an array of image sensors disposed at a distance from the ball lens, the array of image sensors configured to acquire images from light that passes through the ball lens; and a processor configured to deblur and stitch the images captured by the array of image sensors to generate a gigapixel image.

17 Claims, 18 Drawing Sheets

(56) References Cited

U.S. PATENT DOCUMENTS

| | | | |
|---|---|---|---|
| 6,097,545 A * | 8/2000 | Vaughan | G02B 13/06 359/637 |
| 6,320,703 B1 * | 11/2001 | Chen | G02B 13/06 250/207 |
| 6,940,645 B2 | 9/2005 | Liang et al. | |
| 7,298,379 B2 | 11/2007 | Xu et al. | |
| 2003/0128207 A1 | 7/2003 | Sawada | |
| 2004/0066449 A1 | 4/2004 | Givon | |
| 2007/0188653 A1 | 8/2007 | Pollock et al. | |
| 2008/0060034 A1 | 3/2008 | Egnal et al. | |
| 2008/0095466 A1 * | 4/2008 | Kinrot et al. | 382/284 |
| 2008/0128698 A1 | 6/2008 | Martin et al. | |
| 2008/0158341 A1 * | 7/2008 | Gelsomini et al. | 348/36 |
| 2009/0102956 A1 * | 4/2009 | Georgiev | 348/315 |
| 2009/0268983 A1 | 10/2009 | Stone et al. | |
| 2010/0171866 A1 * | 7/2010 | Brady et al. | 348/340 |
| 2011/0211106 A1 * | 9/2011 | Marks et al. | 348/340 |
| 2014/0176710 A1 * | 6/2014 | Brady | G02B 27/0025 348/144 |

OTHER PUBLICATIONS

Ben-Ezra, M., "High Resolution Large Format Tile-Scan Camera: Design, Calibration, and Extended Depth of Field", In Proceedings of the IEEE International Conference on Computational Photography, Cambridge, MA, US, Mar. 29-30, 2010, pp. 1-8.

Brady, D.J. and Hagen, N., "Multiscale Lens Design", In Optics Express, vol. 17, No. 13, Jun. 22, 2009, pp. 10659-10674.

Cossairt, O. and Nayar, S., "Spectral Focal Sweep: Extended Depth of Field from Chromatic Aberrations", In Proceedings of the IEEE International Conference on Computational Photography, Cambridge, MA, US, Mar. 29-30, 2010, pp. 1-8.

Dabov, K., et al.,"Image Denoising with Block-Matching and 3D Filtering", In SPIE Proceedings: Image Processing: Algorithms and Systems, Neural Networks, and Machine Learning, vol. 6064, Feb. 17, 2006, pp. 354-365.

Dinyari et al., "Curving Monolithic Silicon for Nonplanar Focal Plane Array Applications", In Applied Physics Letters, vol. 92, No. 9, Mar. 2008, pp. 1-4.

Dowski Jr., E., et al., "Wavefront Coding: Jointly Optimized Optical and Digital Imaging Systems", In SPIE Proceedings, vol. 4041, Jun. 29, 2000, pp. 114-120.

Dowski Jr., E.R. and Cathey, W.T., "Extended Depth of Field Through Wavefront Coding", In Journal for Applied Optics, vol. 34, No. 11, Apr. 10, 1995, pp. 1859-1866.

Fife, K., et al., "A 3MPixel Multi-Aperture Image Sensor with 0.7μm Pixels in 0.11μm CMOS", In Proceedings in the IEEE International Solid-State Circuit Conference: Digest of Technical Papers (ISSCC '08), Feb. 3-8, 2008, pp. 48-50.

Guichard, F., et al., "Extended Depth-of-Field using Sharpness Transport Across Color Channels", SPIE Proceedings, vol. 7250, Jan. 19, 2009.

International Preliminary Report on Patentability dated May 16, 2013 in International Patent Application No. PCT/US2011/059100, filed Nov. 3, 2011.

International Search Report and Written Opinion in International Patent Application No. PCT/US2011/059100, filed Nov. 3, 2011.

Ko, H., et al., "A Hemispherical Electronic Eye Camera Based on Compressible Silicon Optoelectronics", In Nature, vol. 454, No. 7205, Aug. 7, 2008 pp. 748-753.

Lee, L. and Szema, R., "Inspirations from Biological Optics for Advanced Photonic Systems", In Science, vol. 310, No. 5751, Nov. 18, 2005, pp. 1148-1150.

Lohmann, A.W., "Scaling Laws for Lens Systems", In Applied Optics, vol. 28, No. 23, Dec. 1, 1989, pp. 4996-4998.

Lumenera Corporation, "Lumenera Corporation Company Website", last updated May 2010, pp. 1-6, available at: http://www.lumenera.com/.

Marks, D. and Brady D., "Gigagon: A Monocentric Lens Design Imaging 40 Gigapixels", In Imaging Systems, Tucson, AZ, US, Jun. 7, 2010, pp. 1-3.

Microsoft, "Microsoft Image Composite Editor (ICE)", last updated Jul. 2010, pp. 1-5, available at: http://research.microsoft.com/en-us/um/redmond/groups/ivm/ICE/.

NET Gmbh Company, "NET GmbH Company Website," last updated Jun. 2010, p. 1, available at: http://www.net-gmbh.com.

Nomura, Y., "Scene Collages and Flexible Camera Arrays", In Proceedings of the European Association for Computer Graphics (EACG '07), Grenoble, FR, Jun. 25-27, 2007, pp. 127-138.

Rim, S., et al., "The Optical Advantages of Curved Focal Plane Arrays", In Optics Express, vol. 16, No. 7, Mar. 31, 2008, pp. 4965-4971.

Robinson et al., "Extending Depth-of-Field: Spherical Coding Versus Asymmetric Wavefront Coding", In Computational Optical Sensing and Imaging, Oct. 11, 2009, pp. 1-3.

Robinson, M. and Bhakta, V., "Experimental Validation of Extended Depth-of-Field Imaging via Spherical Coding", In Computational Optical Sensing and Imaging, Oct. 11, 2009, pp. 1-3.

Robinson, M., et al., "Spherical Coded Imagers: Improving Lens Speed, Depth-of-Field, and Manufacturing Yield through Enhanced Spherical Aberration and Compensating Image Processing", In SPIE Proceedings, vol. 7429, Aug. 21, 2009, p. 20.

Swain, P.K., et al., "Curved CCDs and their Application with Astronomical Telescopes and Stereo Panoramic Cameras", In SPIE Proceedings, vol. 5301, Jun. 4, 2004, pp. 109-129.

Wang, S. and Heidrich, W., "The Design of an Inexpensive Very High Resolution Scan Camera System", In Computer Graphics Forum, vol. 23, No. 3, Sep. 2004, pp. 441-450.

Wilburn, B., et al., "High Performance Imaging Using Large Camera Arrays", In Proceedings of the 32nd Annual Conference on Computer Graphics and Interactive Techniques (SIGGRAPH '05), Los Angeles, CA, US, Jul. 31-Aug. 4 2005, pp. 765-776.

Zenmax, "Zemax Optical Design Software", last accessed May 2010, p. 1, available at: http://www.zemax.com.

Zhou, C. and Nayar, S., "What are Good Apertures for Defocus Deblurring?", In Proccedings of the IEEE International Conference on Computational Photography 2009 (ICCP '09), San Francisco, CA, USA, Apr. 16-17, 2009, pp. 1-8.

\* cited by examiner

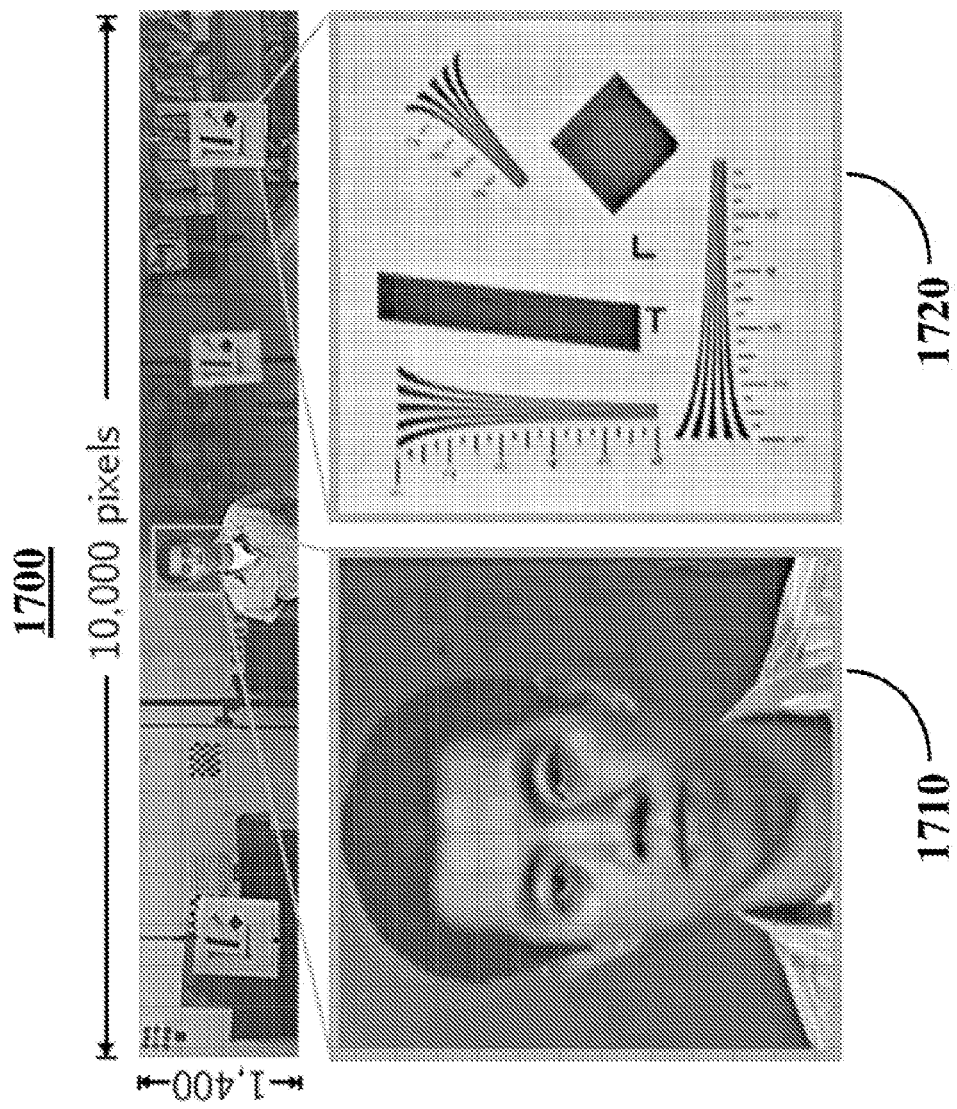

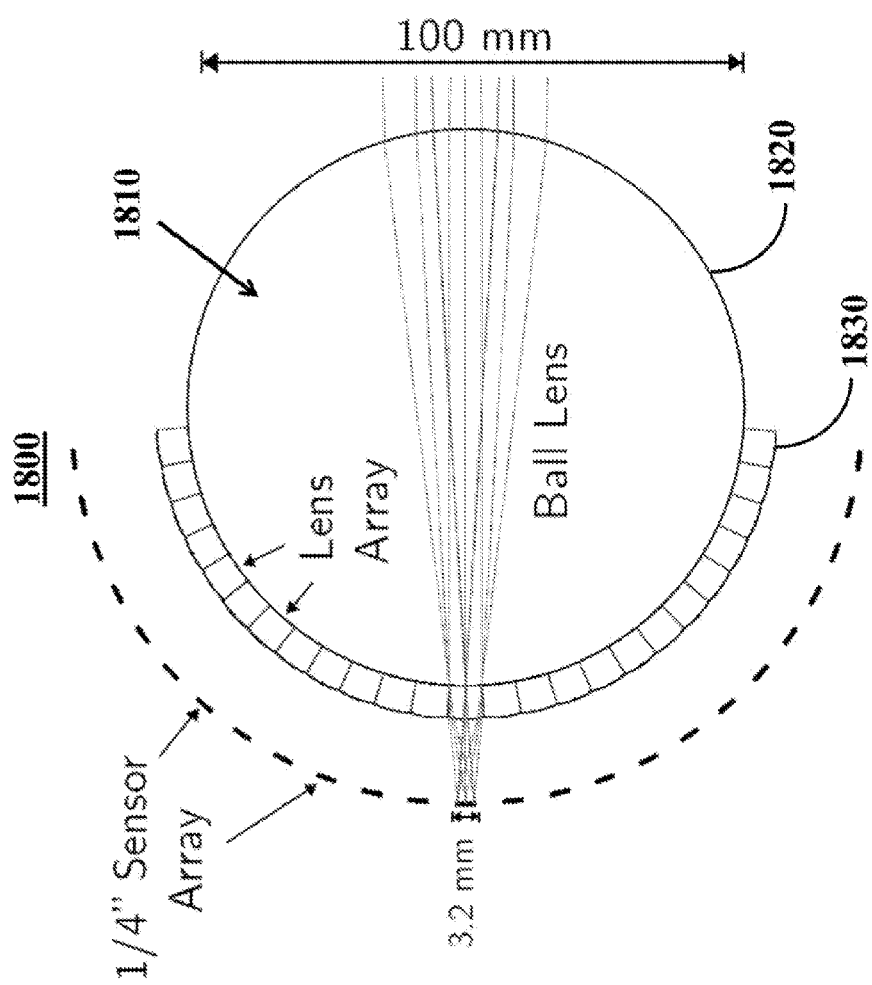

CAMERA SYSTEMS AND METHODS FOR GIGAPIXEL COMPUTATIONAL IMAGING

CROSS REFERENCE TO RELATED APPLICATIONS

This application claims the benefit of U.S. Provisional Patent Application No. 61/409,865, filed Nov. 3, 2010 and U.S. Provisional Patent Application No. 61/450,315, filed Mar. 8, 2011, which are hereby incorporated by reference herein in their entireties.

STATEMENT REGARDING FEDERALLY SPONSORED RESEARCH OR DEVELOPMENT

The invention was made with government support under Grant No. W911NF-10-1-0214 awarded by the Army Research Office (ARO) and a Graduate Research Fellowship Program (GRFP) fellowship awarded by the National Science Foundation (NSF). The government has certain rights in the invention.

TECHNICAL FIELD

The disclosed subject matter relates to camera systems and methods for gigapixel computational imaging.

BACKGROUND

Current high resolution consumer cameras can capture images with pixel counts in the tens of millions. There is an increasing interest in producing images with billions of pixels as a gigapixel image contains a tremendous amount of information such that one can explore minute details of the scene. Gigapixel images capture details that are orders of magnitude greater than that seen by the human eye, revealing information that was completely imperceptible to the photographer at the time of capturing the image.

At present, highly specialized gigapixel imaging systems are being developed for aerial surveillance and for special-purpose large format imaging systems, but there are no commercially available cameras capable of producing gigapixel images. While complementary metal-oxide-semiconductor and charge-coupled device technologies can provide imaging sensors with pixels in the one micron range and while it is within the reach of such manufacturing technologies to produce imaging sensors with one billion pixels, it remains a difficult challenge to design and manufacture lenses that have the resolving power to match the resolution of such a sensor. This is due to the number of resolvable points for a lens, which is sometimes referred to as the space-bandwidth product (SBP), being fundamentally limited by geometrical aberrations. Ideally, lenses are diffraction limited so that increasing the scale of lens while keeping field of view (FOV) fixed increases the space-bandwidth product. However, due to geometrical aberrations, the space-bandwidth product reaches a limit.

One approach for increasing the space-bandwidth product with regard to the fundamental limit is to accept the loss in resolution and increase the size of the sensor. For example, consider the commercially available F/8 500 mm focal length Apo-Symmar lens manufactured by Schneider Optics. If this lens was diffraction limited, it may be capable of resolving a gigapixel image on a 5"×5" sensor. However, because of geometrical aberrations, a sensor size of about 12"×12" is necessary to resolve an image having at least one billion pixels.

Another approach for increasing the space-bandwidth product is to increase complexity as a lens is scaled up. The introduction of more optical surfaces increases the degrees of freedom in lens optimization, which can be used to reduce geometric aberrations and achieve diffraction limited performance. Consider the F/4 75 mm focal length lens shown in FIG. 1. The lens is diffraction limited over a 60° field of view so that a gigapixel image can be resolved on a 75 mm×75 mm surface, which is much smaller than for the Apo-Symmar lens described above. This increase in performance, however, comes at a great cost. The design consists of eleven different optical elements, ranging from 60-100 mm in diameter, resulting in a lens that is both expensive to produce and difficult to align.

Accordingly, it is desirable to provide camera systems and methods that overcome these and other deficiencies of the prior art.

SUMMARY

In accordance with various embodiments, camera systems and methods for gigapixel computational imaging are provided. A camera system in accordance with some embodiments of the disclosed subject matter for capturing gigapixel images includes a ball lens and an array of image sensors. The array of image sensors is configured to acquire a gigapixel image from light that passes through the ball lens. In some embodiments, the array of image sensors is disposed such that the image sensors are a particular distance from the ball lens and such that a contiguous field of view is produced. For example, the camera system can capture a contiguous hemispherical field of view. In another example, the camera system can capture a contiguous spherical field of view.

In some embodiments, the camera system can further include a secondary optic, such as a relay lens, that is associated with each sensor. For example, an array of relay lenses can be provided to modify the magnification of the camera system such that the field of view of adjacent image sensors overlaps slightly. In a more particular example, each sensor can be coupled with a relay lens that decreases the focal length of the ball lens.

In some embodiments, the camera system can further include a processor that is configured to correct for geometrical aberrations by deblurring the image hitting the array of image sensors after passing through the ball lens and/or relay lenses. In some embodiments, the processor can be configured to transform the captured image from a RGB color space to a YUV color space, deconvolve the luminance channel (the Y component) of the captured image in the YUV color space, transform the captured image back to the RGB color space, and/or apply a noise reduction function to the captured image, thereby suppressing deblurring artifacts.

It should be noted that these mechanisms can be used in a variety of applications. For example, these mechanisms can be used to provide a high resolution camera that is capable of capturing images having at least one billion pixels, where the camera has low lens complexity (e.g., fewer optical components) and a compact form factor.

In accordance with various embodiments of the disclosed subject matter, a camera system for high resolution imaging is provided. The camera system comprises: a ball lens, an array of image sensors disposed at a distance from the ball lens, the array of image sensors configured to acquire images from light that passes through the ball lens; and a processor configured to deblur and stitch the images captured by the array of image sensors to generate a gigapixel image.

In some embodiments, a camera system for high resolution imaging comprises: a ball lens having a spherical image plane, wherein the spherical image place is approximated by a tessellated regular polyhedron; a plurality of image sensors disposed on surfaces of the tessellated regular polyhedron, wherein the plurality of image sensors acquire images from light that passes through the ball lens; and a processor configured to deblur and stitch the images captured by the plurality of image sensors to generate a gigapixel image.

In some embodiments, a method for high resolution imaging is provided. The method comprises: detecting a plurality of images from an array of image sensors, wherein each of the plurality of image sensors captures light that passes through a ball lens and an array of relay lenses; deblurring, using a processor, the plurality of images detected by the array of image sensors; and stitching, using the processor, the plurality of deblurred images to generate a gigapixel image.

BRIEF DESCRIPTION OF THE DRAWINGS

FIG. 17 is an illustrative example of an image captured using the camera system of FIG. 16 in accordance with some embodiments of the disclosed subject matter.

FIG. 18 illustrates a camera system that includes a single optical element with a ball lens portion and a lens array portion in accordance with some embodiments of the disclosed subject matter.

DETAILED DESCRIPTION

In accordance with various embodiments of the disclosed subject matter, camera systems and methods for gigapixel computational imaging are provided. More particularly, camera systems and methods for correcting geometric aberrations to capture images that have at least one billion pixels are provided. These images are sometimes referred to herein as "gigapixel images." By correcting for aberrations, imaging devices or systems can be created with higher resolution, low lens complexity, and compact form factor.

To fabricate such a camera system, it should be noted that the resolution of an optical imaging system can be fundamentally limited by geometric aberrations.

It has been observed that lenses of a camera system can obey certain scaling laws that determine how resolution increases as a function of lens size. For example, consider a lens with a focal length f, an aperture diameter D, and an image size $\Delta x$ by $\Delta y$. If the lens is scaled by a factor of M, then focal length f, aperture diameter D, and image size $\Delta x$ by $\Delta y$ are also scaled by a factor of M, but the F/# (F-number or F-stop) and the field of view (FOV) of the lens remain unchanged. If, when the lens is scaled, the minimum resolvable spot size has also not increased by a factor of M, then the total number of points that can be resolved has been increased. The number of resolvable points for a lens is sometimes referred to herein as the "space-bandwidth product." The space-bandwidth product is a unit-less quantity that indicates the number of distinct points which can be measured over a given field of view.

The minimum spot diameter of a lens due to diffraction is $\delta_d \approx \lambda F/\#$, where $\lambda$ is the wavelength of light. Since this quantity is independent of lens scale, the space-bandwidth product for a diffraction limited lens can be represented by:

$$R_d = \frac{M^2 \Delta x \Delta y}{(\lambda F/\#)^2}$$

Figure 1:
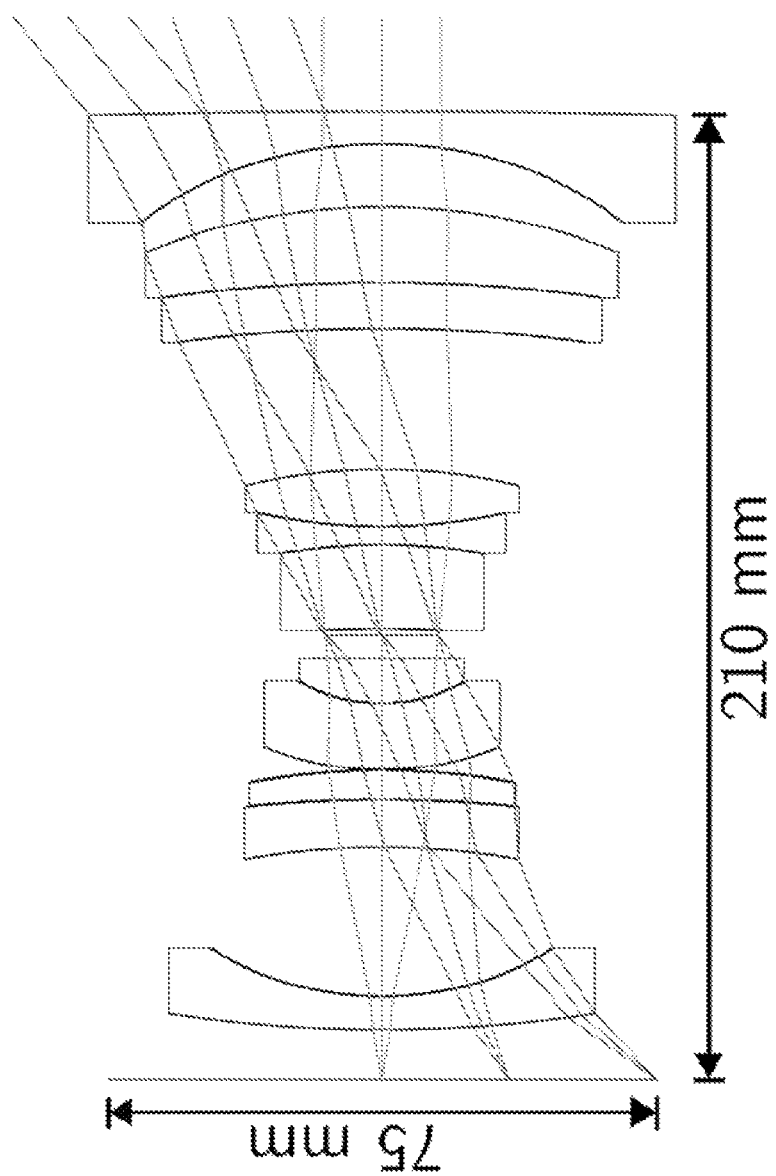
FIG. 1 is a diagram showing an illustrative schematic of the optical components in a F/4 75 mm focal length lens.
Figure 2:
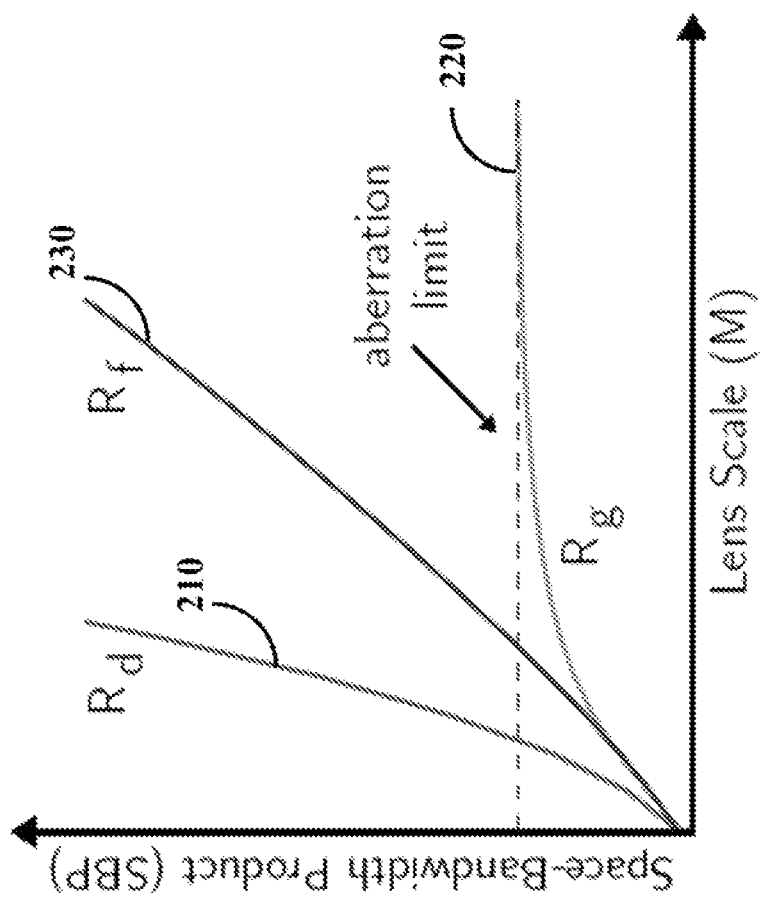
FIG. 2 illustrates a plot showing how space-bandwidth product increases as a function of lens size for a diffraction limited lens, a lens with geometric aberrations, and a lens whose F-number increases with lens size.

FIG. 2 illustrates how space-bandwidth product increases as a function of lens size for a perfectly diffraction limited lens ($R_d$), a lens with geometric aberrations ($R_g$), and a lens with an F/# that increases with lens size ($R_f$). As shown, curve 210 shows that the space-bandwidth product of a diffraction limited lens increases quadratically with the scaling factor (M). However, it should be noted that the space-bandwidth product of a lens can also depend on the diameter of the blur circle caused by geometric aberrations, $\delta_g$, which increases linearly with the scaling factor (M). As a result, when aberrations are considered, the space-bandwidth product can be represented by:

$$R_g = \frac{M^2 \Delta x \Delta y}{(\lambda F/\#)^2 + M^2 \delta_g^2}$$

Referring back to FIG. 2, curve 220 shows that the space-bandwidth product plateaus at $\Delta x \Delta y / \delta_g^2$ when the lens is no longer diffraction limited and $M\delta_g \gg \lambda F/\#$. Since the geometric blur size can be decreased by stopping down a lens, lens designers generally reduce the F/# as a lens is scaled up. Generally speaking, F/# is increased such that the focal length (in millimeters) is approximately equal to $(F/\#)^3$. For example, a 500 mm focal length Apo-Symmar lens manufactured by Schneider Optics operates at F/8 and $8^3 \approx 500$. If this is used on a lens that primarily exhibits spherical aberrations, it should be noted that the geometric blur size $\delta_g$ becomes independent of the scaling factor M. Accordingly, the space-bandwidth product for such a lens can be represented by:

$$R_f = \frac{M^2 \Delta x \Delta y}{\lambda^2 M^{2/3} + \delta_g^2}$$

This space-bandwidth product for a lens with an F/# that increases with lens size is shown as curve 230 in FIG. 2.

Figures 3, 4:
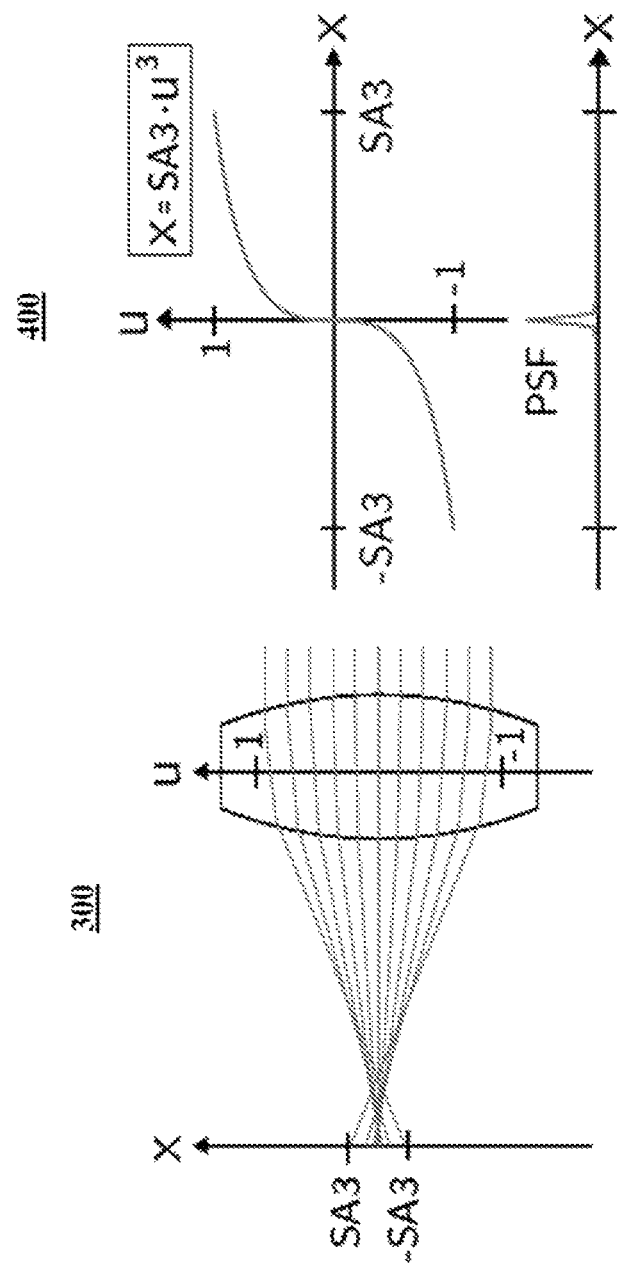
FIG. 3 illustrates a singlet lens with spherical aberrations in accordance with some embodiments of the disclosed subject matter.
FIG. 4 illustrates the ray fan and the point spread function for a lens with spherical aberrations in accordance with some embodiments of the disclosed subject matter.

While it may be assumed that the minimum resolvable spot size is equal to the blur size due to geometric aberrations, $\delta_g$, the blur caused by a lens with spherical aberrations can be removed via deconvolution. This is because a lens with spherical aberrations produces a point spread function (PSF) that is well-conditioned and easily invertible. FIG. 3 shows an example of a point spread function for a singlet lens with strong spherical aberrations. As shown in point spread function 300, the point spread function is a distribution of light energy, where several rays from a distant point source are traced through a lens with spherical aberrations. The position x of each light ray on the sensor plane as a function of position u in the aperture plane is given by the cubic curve $x = SA3 \cdot u^3$, where SA3 is the spherical aberration coefficient. This is shown, for example, in FIG. 4. The point spread function is found by projecting this curve along the sensor axis, resulting in a sharply peaked point spread function. The modulus of the Fourier transform of this point spread function, sometimes referred to as the modulation transfer function (MTF), is relatively large at high frequencies and has no zero crossings. As a result, a captured image can be deblurred without increasing significant artifacts.

For a computational imaging system with deblurring in accordance with some embodiments of the disclosed subject matter, the resolution is given by the pixel size $\xi$ and the space-bandwidth product does not depend directly on geometric aberrations, $\delta_g$. It should be noted that an additional quantity for measuring image quality is signal-to-noise ratio (SNR). In the absence of any noise, the space-bandwidth product can be theoretically increased by decreasing pixel size until reaching the diffraction limit.

To accommodate or fix the signal-to-noise ratio, consider the effect of deblurring on signal-to-noise ratio. The signal-to-noise ratio of an image produced by a computational imaging system is $1/\sigma_D$, where $\sigma_D$ is the deblurring error. To calculate the deblurring error, a captured image can be simulated by blurring a ground truth image with the point spread function at the given scale and adding white Gaussian noise with a standard deviation $\sigma_N$. The blurred image can then be deblurred using Wiener deconvolution and $\sigma_D$ can be calculated as the root-mean-square (RMS) deviation or RMS error between the deblurred and ground truth images averaged over a set of natural images.

Figure 5:
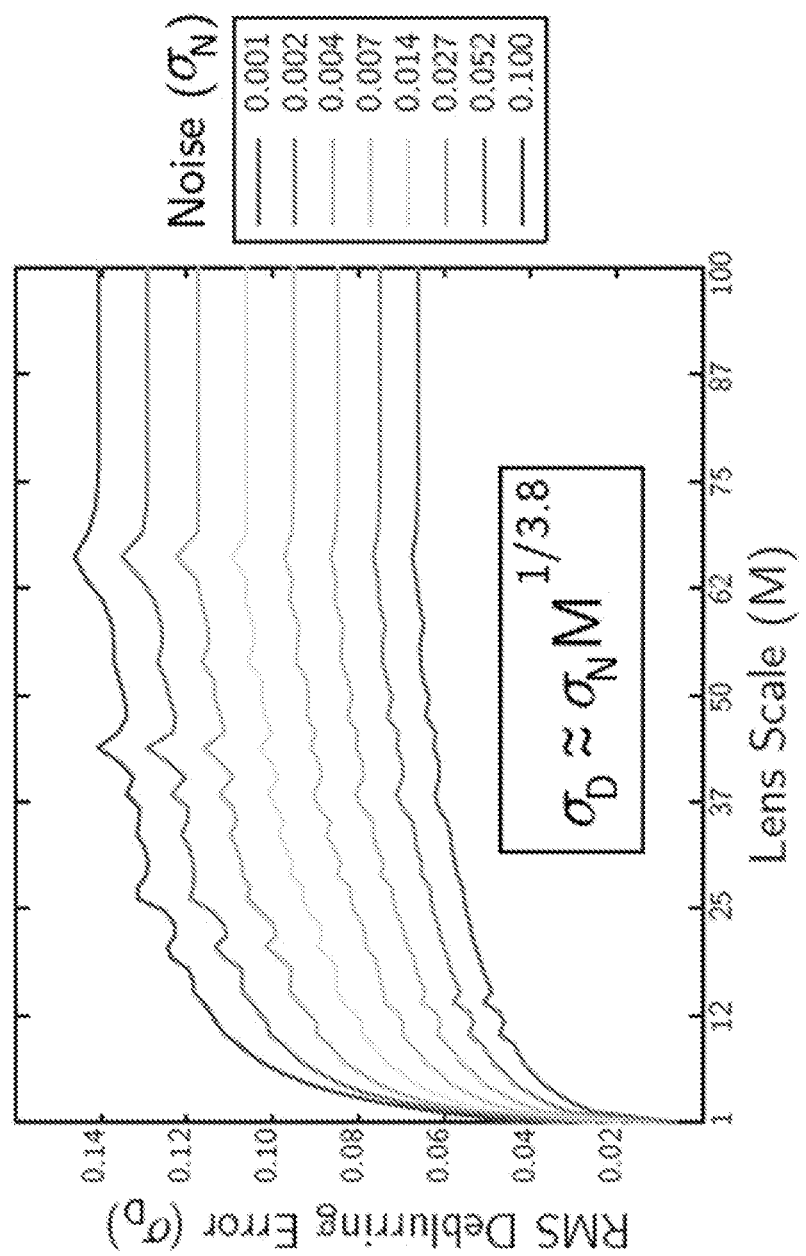
FIG. 5 illustrates the root-mean-square deblurring error as a function of lens scale for a lens with spherical aberrations in accordance with some embodiments of the disclosed subject matter.

FIG. 5 shows the deblurring error as a function lens scale (M) for a lens with spherical aberrations in accordance with some embodiments of the disclosed subject matter. As shown in plot 500, the deblurring error curves are shown for a variety of noise ($\sigma_N$). For plot 500, the best fit polynomial is found to be in the range from $\sigma_D \propto \sigma_N M^{1/3.6}$ and $\sigma_D \propto \sigma_N M^{1/4}$, which can then be approximated by:

$$\sigma_D \approx \sigma_N M^{1/3.8}$$

It should be noted that both the point spread function size and deblurring error increase as lens scale increases. While the size of the point spread function increases linearly with lens scale, deblurring errors increases with $M^{1/3.8}$.

In addition, pixel size $\xi$ can be related to sensor noise $\sigma_N$. Note that scaling the pixel size $\xi$ by a factor of M increases the pixel area by a factor of $M^2$. For a fully saturated pixel, assuming a shot noise limited sensor, this can increase the sensor's full well capacity by $M^2$ and decrease noise by a factor of $M^{-1}$ relative to the signal. The sensor noise can then be related to pixel size as:

$$\sigma_N = \frac{k}{\xi}$$

It should be noted that k in the above-mentioned equation is a constant.

By fixing the signal-to-noise ratio in the camera system (e.g., by fixing $\sigma_D$) and using the above-mentioned equations to define a new constant $k_1 = k/\sigma_D$, the pixel size $\xi$ and the lens scale M can be related by the following:

$$\xi = k_1 M^{1/3.8}$$

Upon assuming that the pixel size is greater than the diffraction limited spot size, the number of resolvable points can be determined by dividing the sensor area by the pixel area, which can be represented as:

$$R_c = \frac{M^2 \Delta x \Delta y}{\xi^2} = \frac{M^2 \Delta x \Delta y}{k_1^2 M^{2/3.8}}$$

Figure 6:
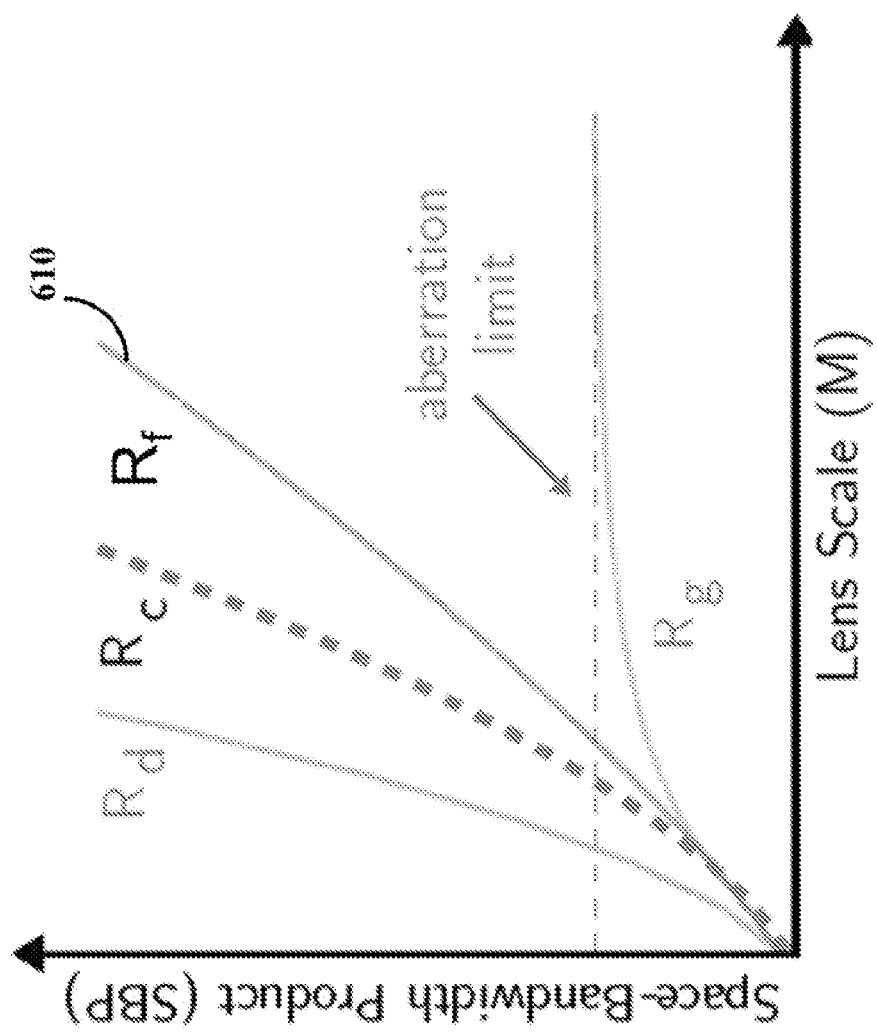
FIG. 6 illustrates a plot showing the space-bandwidth product for a camera system with gigapixel computation imaging as a function of lens scale in accordance with some embodiments of the disclosed subject matter.

The above-derived equation can be used as a scaling law for computational imaging and is shown in FIG. 6. As shown in plot 600, the $R_c$ curve 610 improves upon the aberration limited curve $R_g$ and improves upon the conventional lens design curve $R_f$ without requiring F/# to increase with lens scaling M. That is, for a camera system with a fixed SNR (fixed deblurring error), the space-bandwidth product scales more quickly with lens size than it does for conventional lens designs.

Accordingly, a camera system that includes the computational imaging approach can provide a camera system capable of greater resolution with a small camera size. For example, a camera system can be provided for capturing gigapixel images with low lens complexity and compact form factor.

In accordance with some embodiments, the camera system for high resolution imaging can include a ball lens, an array of planar sensors, and a processor that performs a deconvolution approach on captured images. This compact camera system can be used to capture gigapixel images.

Figure 7:
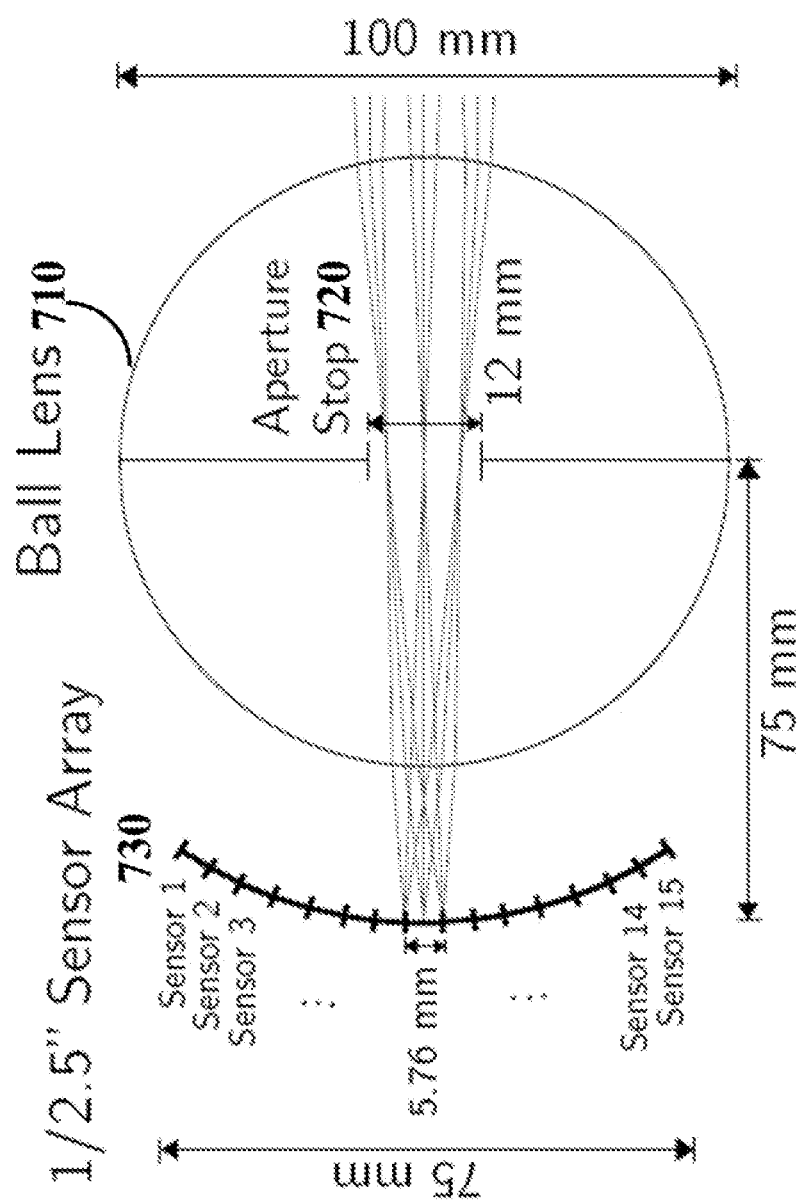
FIG. 7 illustrates a camera system that includes a ball lens and an array of sensors in accordance with some embodiments of the disclosed subject matter.

In some embodiments, the size of the sensors in the array of planar sensors can be selected relative to the ball lens. The ball lens and spherical image plane produce a camera system with radial symmetry. The spherical image plane can be approximated with a tessellated regular polyhedron, where a planar sensor is placed on each surface of the tessellated regular polyhedron. For example, as shown in FIG. 7, the camera system can include a ball lens 710 with an aperture stop 720 surrounded by an array of planar sensors 730 placed on the surface of the polyhedron. In a more particular example, the ball lens can be a 100 mm acrylic ball lens and the planar sensor can be a 5 megapixel 1/2.5" sensor. The planar sensors can be placed around any suitable portion of the ball lens—e.g., around the entire ball lens, around a hemisphere of the ball lens, etc.

It should be noted that, in some embodiments, relatively small sensors can be used such that each sensor occupies a small field of view and the image plane closely approximates the spherical surface.

Figures 8, 9:
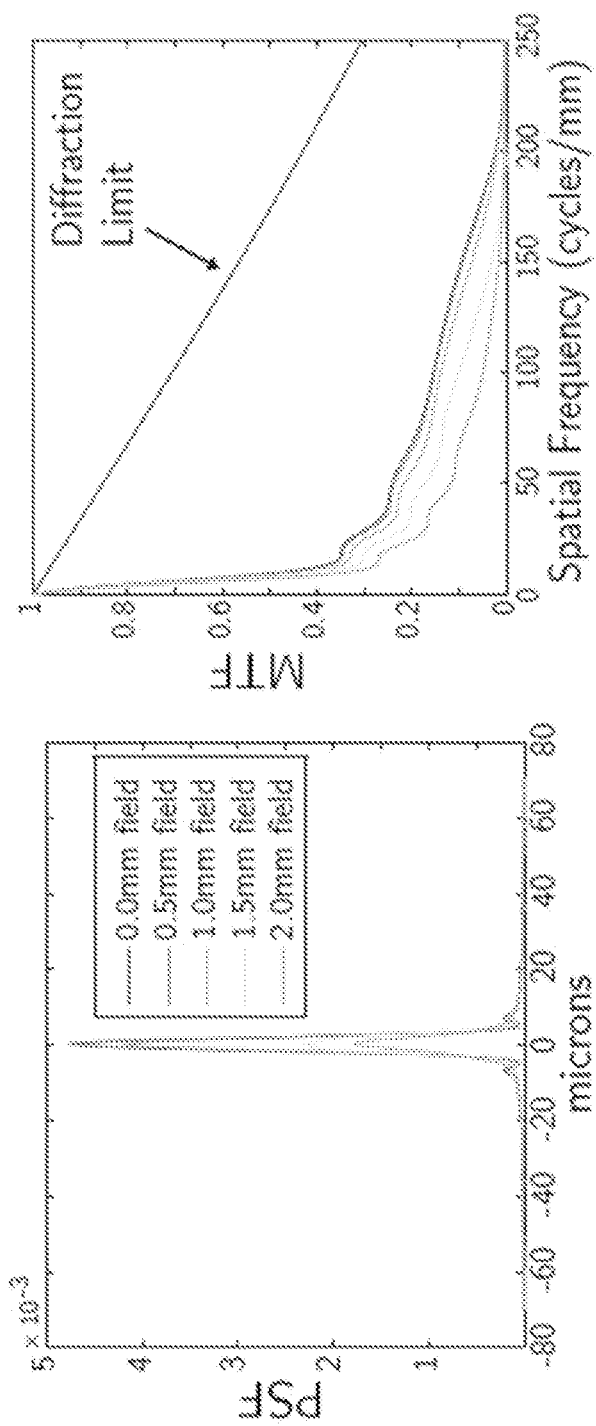
FIG. 8 illustrates the point spread function for the camera system of FIG. 7 in accordance with some embodiments of the disclosed subject matter.
FIG. 9 illustrates the modulation transfer function (MTF) for the camera system of FIG. 7 in accordance with some embodiments of the disclosed subject matter.

FIG. 8 shows an illustrative point spread function as a function of field position on each individual sensor. Note that the point spread function shape remains significantly consistent across the field of view of each sensor. As such, the camera system can produce a point spread function that is nearly spatially invariant to field position on the sensor. FIG. 9 shows an illustrative plot of modulus of the Fourier transform of this point spread function or the modulation transfer function. As shown in FIG. 9, the modulation transfer function avoids zero crossings up to the Nyquist frequency of the sensor and preserves high frequencies. As a result, a captured image can be deblurred without increasing significant artifacts.

Figure 10:
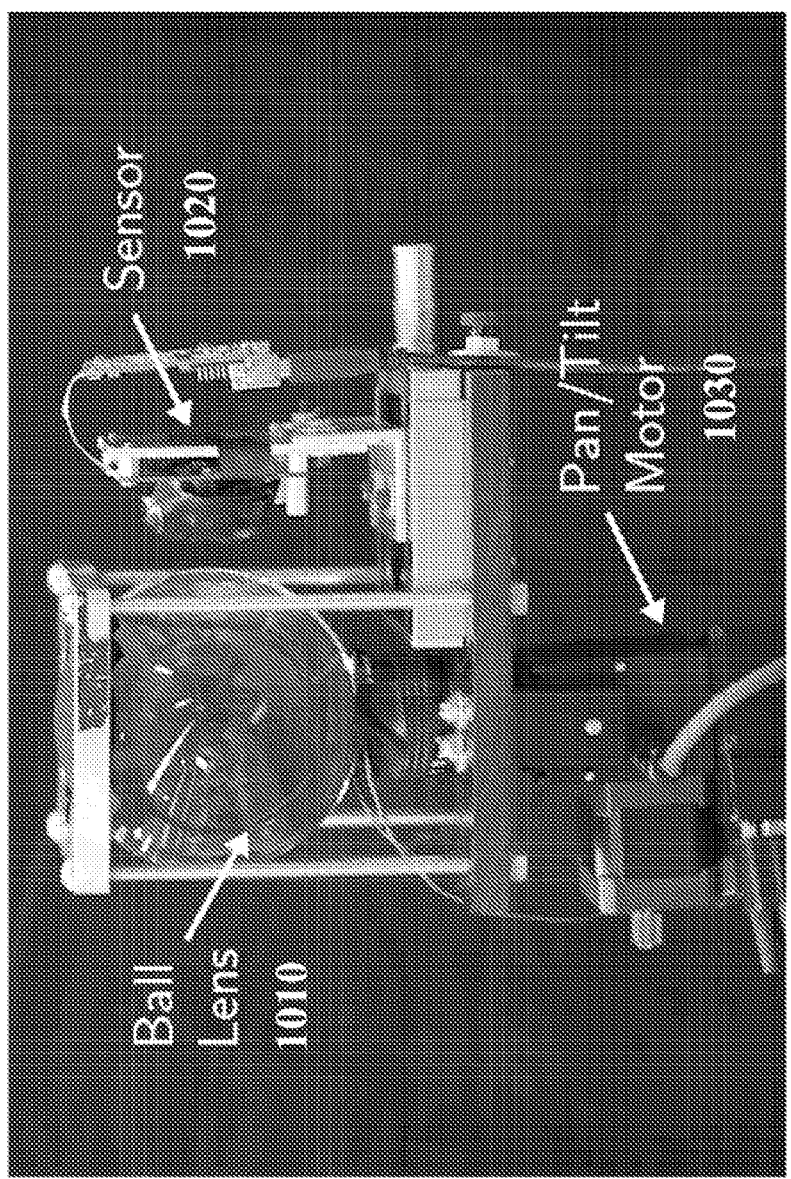
FIG. 10 is an illustrative example of a camera system including a ball lens and a sensor connected to a pan/tilt motor in accordance with some embodiments of the disclosed subject matter.

In some embodiments, a pan/tilt motor can be implemented with an image sensor in the camera system. Referring back to FIG. 7, each of the sensors in the array of planar sensors can be replaced with a single sensor operatively connected to a pan/tilt motor, where the pan/tilt motor sequentially scans the image plane. An illustrative example of the camera system with a pan/tilt motor is shown in FIG. 10. As shown, the camera system includes an aperture placed on the surface of a 100 mm acrylic ball lens 1010. A gigapixel image is captured by sequentially translating a 5 megapixel 1/2.5" sensor 1020 with a pan/tilt motor 1030. Accordingly, in some embodiments, an image captured by multiple sensors can be emulated by sequentially scanning the image plane using the pan/tilt motor.

Figure 11:
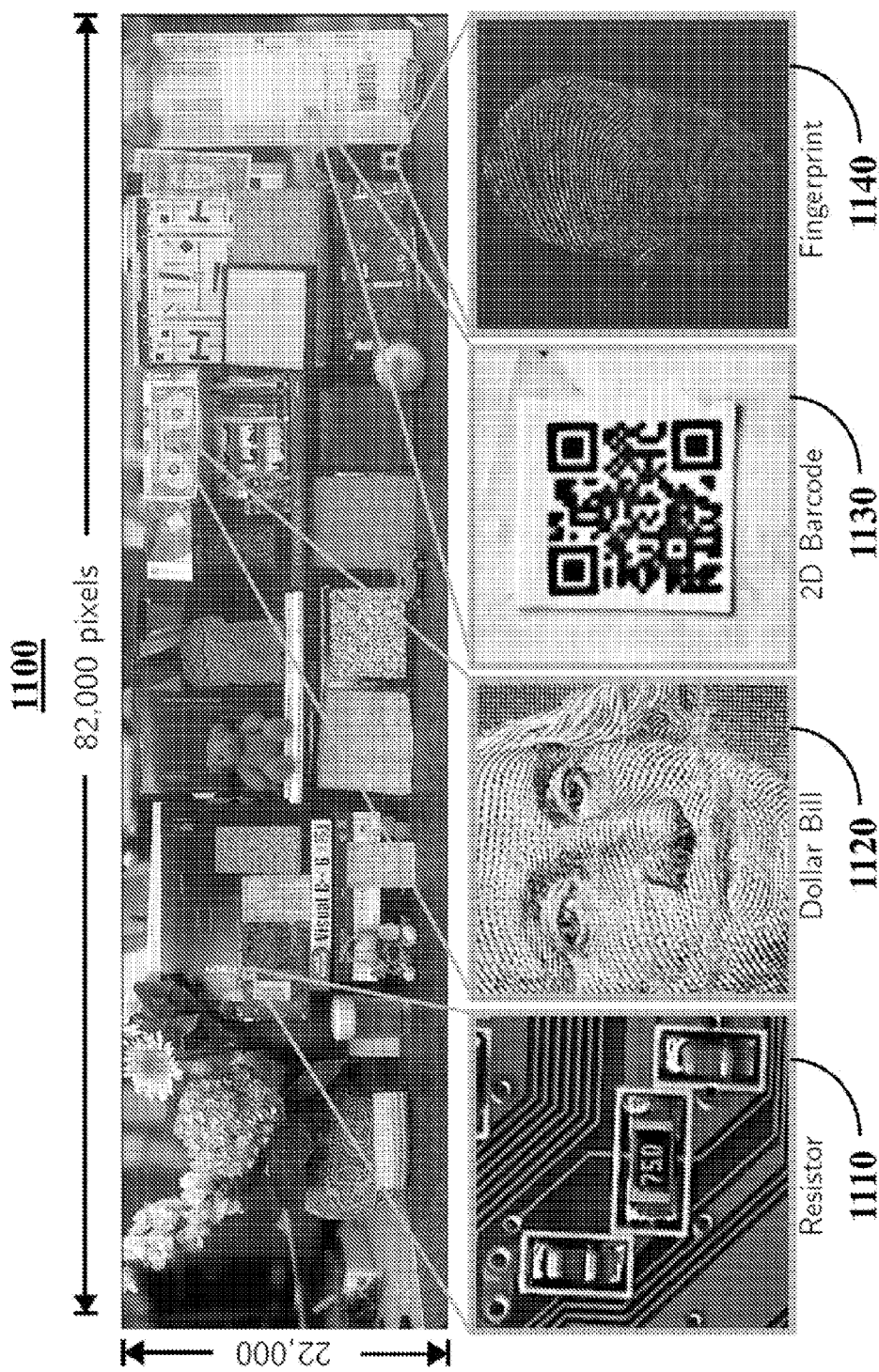
FIGS. 11 and 12 are illustrative examples of gigapixel images captured using the camera system of FIG. 10 in accordance with some embodiments of the disclosed subject matter.
Figure 12:
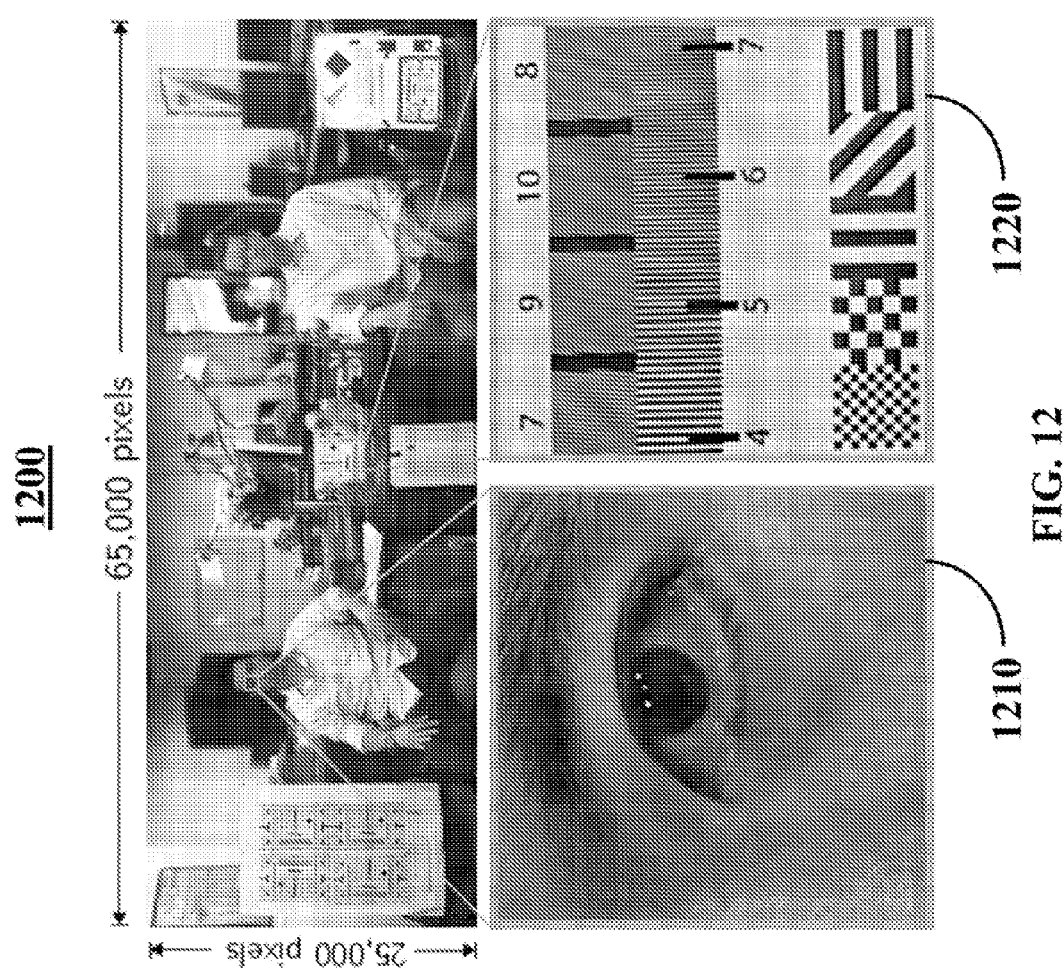

With these embodiment of the camera system, an image having at least one billion pixels can be generated over a 60° by 40° field of view by tiling 14×14 sensors onto a 75×50 mm image surface. FIGS. 11 and 12 are examples of gigapixel images 1100 and 1200 captured using the camera system. As shown in FIG. 11, an image 1100 having 1.7 gigapixels and having image dimensions of 82,000 pixels by 20,000 pixels is captured using the camera system in accordance with some embodiments of the disclosed subject matter. The image scene occupies a 126° by 32° field of view. As also shown in FIG. 11, image portions 1110, 1120, 1130, and 1140 of gigapixel image 1100 are enlarged using a 60 by 200 digital zoom to illustrate the details captured in the image—e.g., the details of the resistor on a printed circuit board in portion 1110, the stippling print pattern on a dollar bill in portion 1120, a miniature two-dimensional barcode pattern in portion 1130, and the fine ridges of a fingerprint on a remote control in portion 1140. As shown in FIG. 12, an image 1200 having 1.6 gigapixels and having image dimensions of 65,000 pixels by 25,000 pixels is captured using the camera system in accordance with some embodiments of the disclosed subject matter. The image scene occupies a 104° by 40° field of view. As also shown in FIG. 12, image portions 1210 and 1220 of gigapixel image 1200 are enlarged using a digital zoom to illustrate the details captured in the image—e.g., the individual hairs and the pores of a person in portion 1210 and fine features of a resolution chart in portion 1220.

In some embodiments, the camera system can include a secondary optic associated with each sensor. It should be noted that, while the sensor configuration in above-mentioned camera system can provided with no dead space between adjacent sensors, the secondary optic can be provided such that some space can be provided between adjacent sensors. For example, using the camera system with the secondary optic, a sensor can include packaging around the active pixel area. Accordingly, in some embodiments, a secondary optic, such as a relay lens, can be associated with each sensor in the array of sensors.

Figure 13:
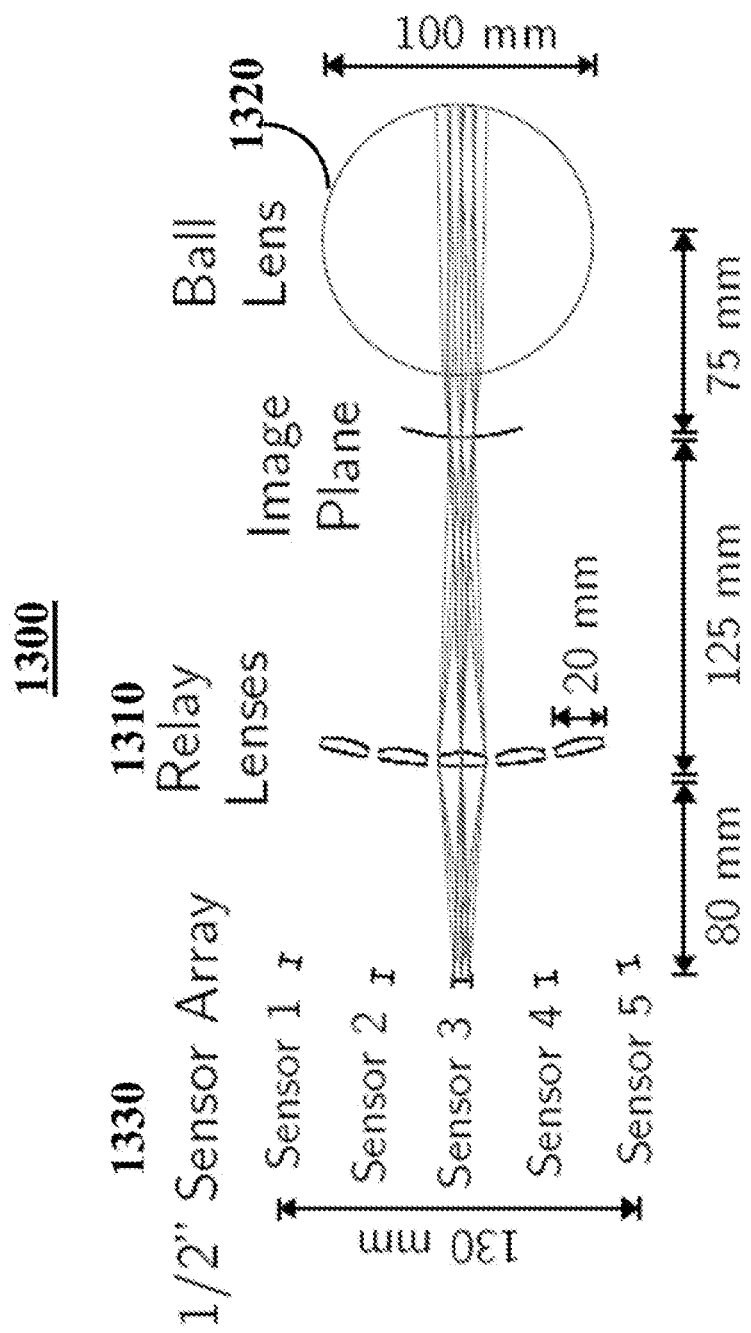
FIG. 13 illustrates a camera system that includes a ball lens, an array of relay lenses, and an array of image sensor in accordance with some embodiments of the disclosed subject matter.

FIG. 13 shows an illustrative camera system 1300 with a secondary optic in accordance with some embodiments of the disclosed subject matter. As shown in FIG. 13, an array of relay lenses 1310 is implemented in the camera system, where the array of relay lenses 1300 modifies the magnification of the camera system such that the field of view of adjacent sensors overlaps slightly. The array of relay lenses 1310 is placed between a ball lens 1320 and an array of image sensors 1330, where each of the sensors in the array of image sensors 1330 is coupled with a relay lens in the array of relay lenses 1310 that decreases the focal length of the ball lens 1320. More particularly, each sensor in the array of image sensors 1330 is coupled with a smaller acrylic relay lens that decreases the focal length of the larger acrylic ball lens 1320.

Figures 14, 15:
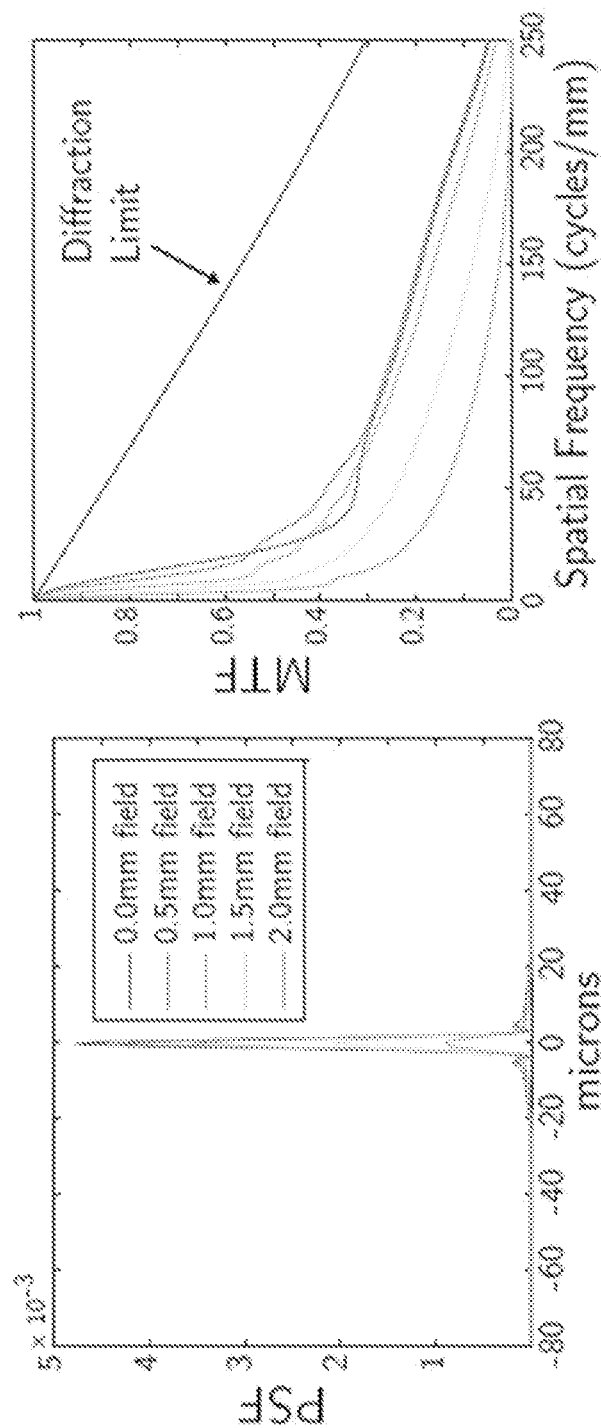
FIG. 14 illustrates the point spread function for the camera system of FIG. 13 in accordance with some embodiments of the disclosed subject matter.
FIG. 15 illustrates the modulation transfer function (MTF) for the camera system of FIG. 13 in accordance with some embodiments of the disclosed subject matter.

As shown in FIGS. 14 and 15, the point spread function and the modulation transfer function of the camera system of FIG. 13 is similar to the point spread function and the modulation transfer function of the camera system of FIG. 7. Accordingly, a captured image using the camera system of FIG. 13 can be deblurred without increasing significant artifacts.

Figure 16:
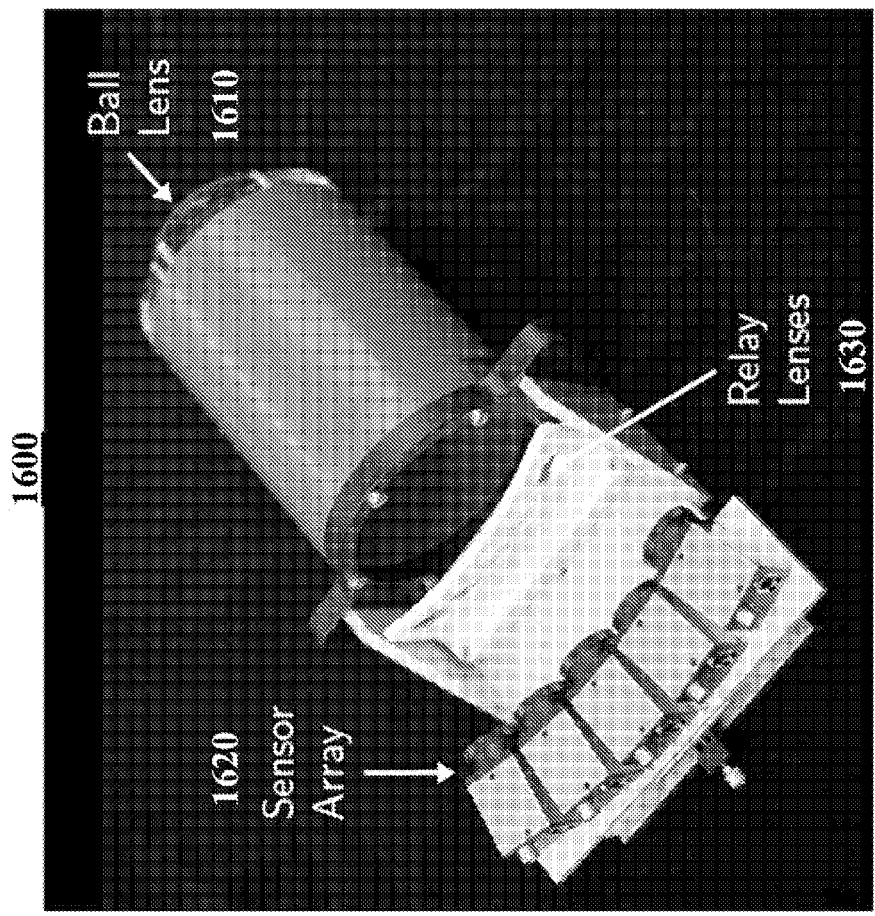
FIG. 16 is an illustrative example of a camera system including a ball lens and a plurality of sensors coupled with a plurality of relay lenses in accordance with some embodiments of the disclosed subject matter.

An illustrative example of the camera system with an array of relay lenses is shown in FIG. 16. As shown, the camera system 1600 includes an aperture placed on the surface of a 100 mm acrylic ball lens 1610 along with an array of five sensors 1620 coupled with an array of five relay lenses 1630 for capturing a 15 megapixel region of a gigapixel image. With the embodiment of the camera system shown in FIG. 16, an image 1700 having fourteen million pixels can be captured over a 15° by 2° field of view. As shown in FIG. 17, image 1700 having image dimensions of 10,000 pixels by 1,400 pixels is captured using the camera system in accordance with some embodiments of the disclosed subject matter. Similar to FIG. 12, portions 1710 and 1720 of image 1700 show a close-up of a person's face and a resolution target, respectively.

It should be noted that, although the camera system of FIG. 16 includes five sensors in the array of sensors and five relay lenses in the array of relay lenses, FIG. 16 shows a portion of the camera system for capturing gigapixel images. A camera system having an array of sensors and an array of relay lenses can include additional sensors and additional relay lenses (e.g., fifteen sensor-relay lens pairs, thirty sensor-relay lens pairs, etc.) to capture a gigapixel image.

Figure 20:
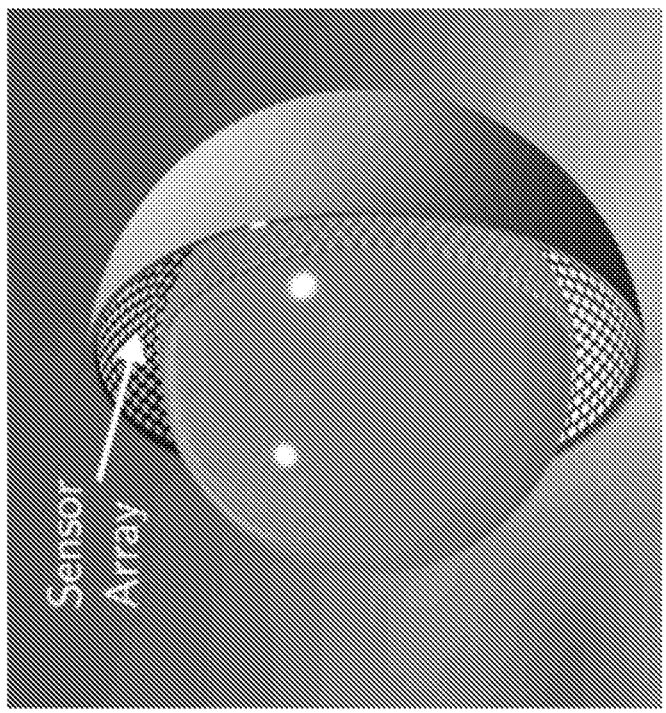
FIGS. 19 and 20 are illustrative examples of a camera system with a single optical element in accordance with some embodiments of the disclosed subject matter.
Figure 19:
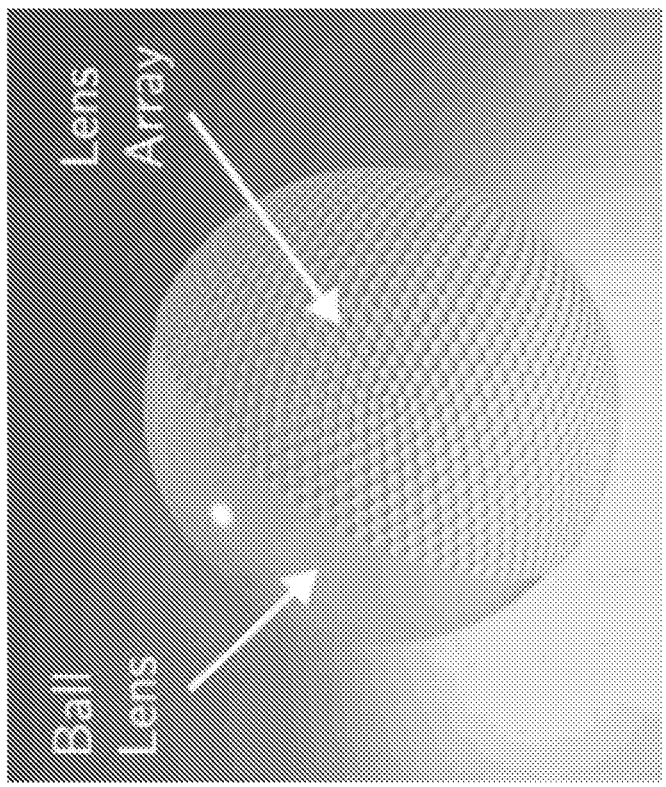

In some embodiments, the camera system can include a single optical element that includes an acrylic ball lens with relay lenses formed such that they share a surface with the acrylic ball lens. For example, FIG. 18 shows a camera system 1800 that includes a single optical element 1810 molded from a single material, where the molded optical element 1810 includes a ball lens portion 1820 with a relay lens portion 1830 formed on the surface of the ball lens portion 1820. It should be noted that a single optical element reduces the alignment needed for systems with multiple optical elements, thereby significantly reducing the complexity of the camera system. An example of a camera system that combines the optical system into a single element that is manufactured by a molding a single material is shown in FIGS. 19 and 20.

Figure 21:
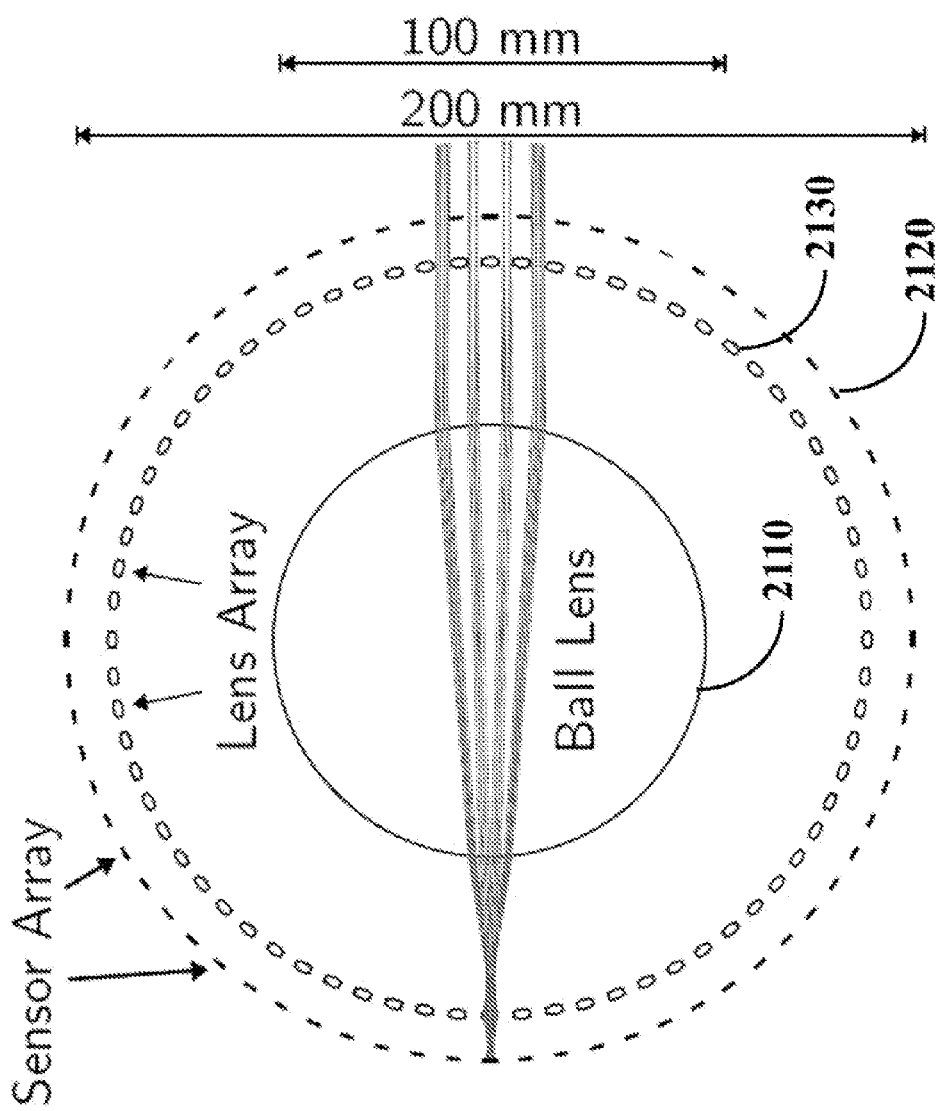
FIG. 21 illustrates a camera system with a $2\pi$ radian field of view that can capture gigapixel images in accordance with some embodiments of the disclosed subject matter.

Although the embodiments described above use a ball lens with its perfect radial symmetry to capture a near hemispherical field of view, this is only illustrative. In some embodiments, the camera system can be used to capture a spherical field of view. For example, as shown in FIG. 21, a camera system 2100 capable of capturing gigapixel images is shown having a 2π radian field of view. Camera system 2100 includes a ball lens 2110, an array of planar sensors 2120, and an array of relay lenses 2130, where a sensor from the array of planar sensors 2120 is coupled with a relay lens from the array of relay lenses 2130. Similar to the camera systems shown in FIGS. 7 and 13, the camera system 2100 has a gap between adjacent lens/sensor pairs. Using camera system 2100, light passes through the gaps on one hemisphere and forms an image on a sensor located on the opposite hemisphere.

Figure 22:
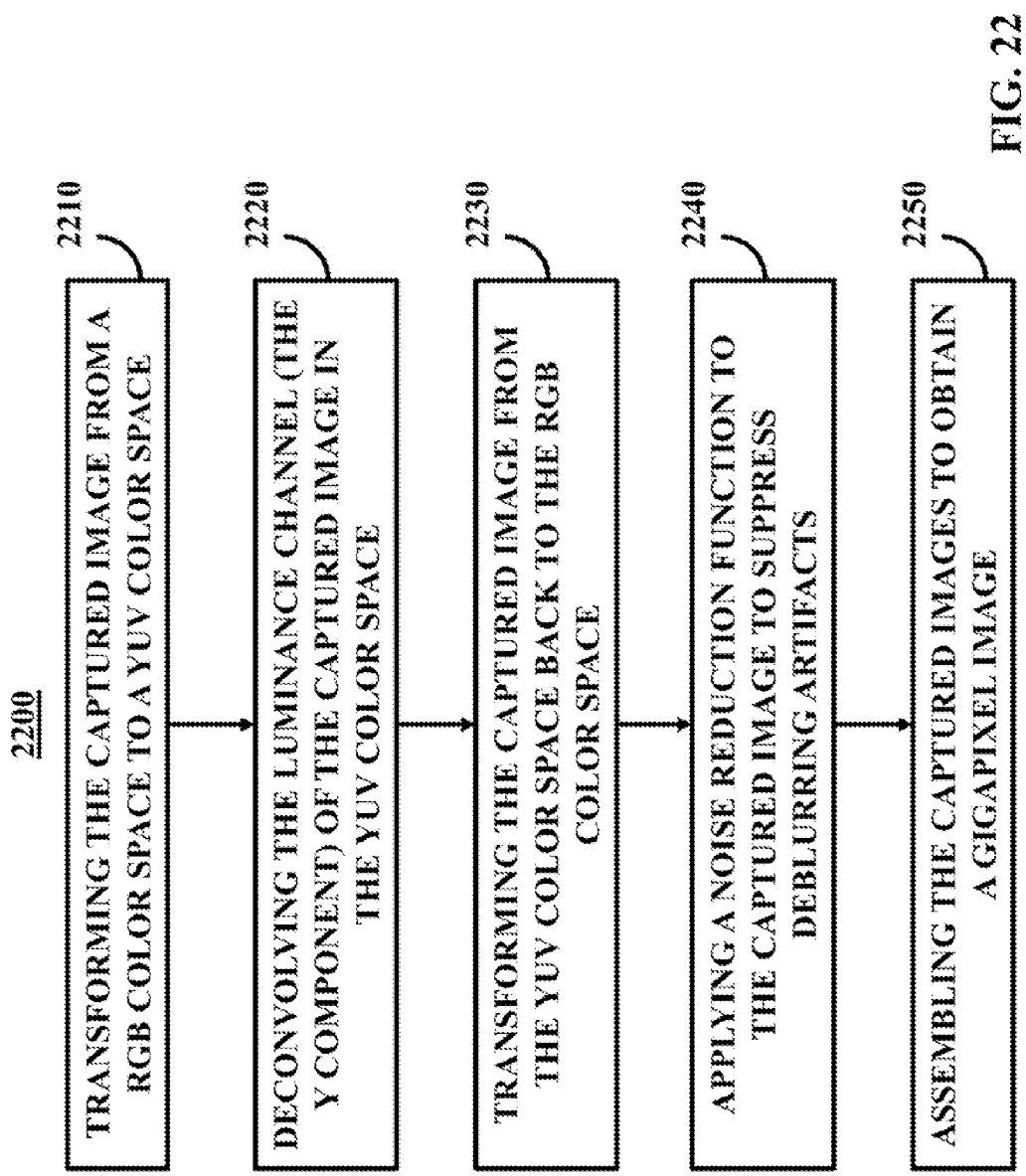
FIG. 22 is a diagram showing an illustrative example of a process for corrected for geometrical aberrations in captured images in accordance with some embodiments of the disclosed subject matter.

In some embodiments, the camera system can include a processor for processing captured images. More particularly, the processor can be connected to the sensor or array of sensors and can be configured to correct for geometrical aberrations. FIG. 22 is a diagram showing an illustrative example of a process for corrected for geometrical aberrations in captured images in accordance with some embodiments of the disclosed subject matter. To correct for geometrical aberrations, the processor can be used to deblur the image hitting the array of image sensors after passing through the ball lens and/or one or more relay lenses. As shown, process 2200 begins by transforming each captured image from a RGB color space to a YUV color space at 2210. Next, the processor can deconvolve the luminance channel (the Y component) of each captured image in the YUV color space at 2220 (e.g., using Wiener deconvolution) and can transform each captured image back to the RGB color space at 2230. At 2240, a noise reduction function (e.g., a block matching and 3D filtering function for image denoising) can be applied to each captured image to suppressing deblurring artifacts. At 2250, the processed images captured from the array of sensors can be assembled or stitched together to obtain a gigapixel image (e.g., using Microsoft Image Compositing Editor).

In some embodiments, hardware used in connection with the camera mechanisms can include an image processor, an image capture device (that includes a ball lens, one or more image sensors, and one or more relay lenses), and image storage. The image processor can be any suitable device that can process images and image-related data as described herein (e.g., to deconvolve images captured using the one or more image sensors). For example, the image processor can be a general purpose device such as a computer or a special purpose device, such as a client, a server, an image capture device (such as a camera, video recorder, scanner, mobile telephone, personal data assistant, etc.), etc. It should be noted that any of these general or special purpose devices can include any suitable components such as a processor (which can be a microprocessor, digital signal processor, a controller, etc.), memory, communication interfaces, display controllers, input devices, etc. The image capture device can be any suitable device for capturing images and/or video, such as a portable camera, a video camera or recorder, a computer camera, a scanner, a mobile telephone, a personal data assistant, a closed-circuit television camera, a security camera, an Internet Protocol camera, etc. The image capture device can include the generalized assorted pixel color filter array as described herein. The image storage can be any suitable device for storing images such as memory (e.g., non-volatile memory), an interface to an external device (such as a thumb drive, a memory stick, a network server, or other storage or target device), a disk drive, a network drive, a database, a server, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, camera systems and methods for gigapixel computational imaging are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A camera system for high resolution imaging, the camera system comprising:
    a ball lens;
    an array of image sensors disposed at a distance from the ball lens, the array of image sensors configured to acquire images from light that passes through the ball lens;
    an array of relay lenses disposed on a surface of the ball lens and positioned between the ball lens and the array of image sensors, wherein each relay lens of the array of relay lenses is coupled with an image sensor of the array of image sensors; and a processor configured to deblur and stitch the images captured by the array of image sensors to generate a gigapixel image.

2. The camera system of claim 1, wherein each image sensor in the array of image sensors is coupled with a relay lens in the array of relay lenses to decrease focal distance.

3. The camera system of claim 1, wherein the ball lens and the array of relay lenses are formed as a single optical element.

4. The camera system of claim 1, wherein a spacing is provided between adjacent image sensors in the array of image sensors.

5. The camera system of claim 1 wherein an image sensor of the array of image sensors has a first field of view and an adjacent image sensor of the array of image sensors has a second field of view and wherein the plurality of relay lenses are arranged such that the first field of view and the second field of view overlap.

6. The camera system of claim 1, wherein:
the array of sensors and the array of relay lenses are formed around the ball lens;
each sensor of the array of sensors is paired with each relay lens in the array of relay lenses;
a gap is formed between adjacent pairs of sensors and relay lens; and
light passes through the gap on one hemisphere to form an image on an image sensor located on an opposing hemisphere.

7. The camera system of claim 1, wherein a spherical image plane corresponding to the ball lens is approximated with a polyhedron having a plurality of surfaces and wherein each image sensor of the array of image sensors is placed on one of the plurality of surfaces of the polyhedron.

8. The camera system of claim 1, wherein the processor is further configured to:
transform each of the images from a RGB color space to a YUV color space, wherein the YUV color space includes a luminance component and a chrominance component;
deconvolve the luminance component of each of the transformed images;
transform each of the deconvolved images from the YUV color space to the RGB color space;
apply a noise reduction function to the images to suppress deblurring artifacts; and
assemble the images to generate the gigapixel image.

9. A camera system for high resolution imaging, the camera system comprising:
a ball lens having a spherical image plane, wherein the spherical image place is approximated by a tessellated regular polyhedron;
a plurality of image sensors disposed on surfaces of the tessellated regular polyhedron, wherein the plurality of image sensors acquire images from light that passes through the ball lens;
a plurality of relay lenses disposed on a surface of the ball lens and positioned between the ball lens and the plurality of image sensors, wherein each relay lens of the plurality of relay lenses is coupled with an image sensor of the plurality of image sensors; and
a processor configured to deblur and stitch the images captured by the plurality of image sensors to generate a gigapixel image.

10. A method for high resolution imaging, the method comprising:
detecting a plurality of images from an array of image sensors, wherein each of the plurality of image sensors captures light that passes through a ball lens and an array of relay lenses that are formed on a surface of the ball lens;
deblurring, using a processor, the plurality of images detected by the array of image sensors; and
stitching, using the processor, the plurality of deblurred images to generate a gigapixel image.

11. The method of claim 10, further comprising decreasing focal length of the ball lens by coupling each image sensor in the array of image sensors with a relay lens in the array of relay lenses.

12. The method of claim 10, wherein the ball lens and the array of relay lenses are formed as a single optical element.

13. The method of claim 10, wherein a spacing is provided between adjacent image sensors in the array of image sensors.

14. The method of claim 10, wherein an image sensor of the array of image sensors has a first field of view and an adjacent image sensor of the array of image sensors has a second field of view and wherein the plurality of relay lenses are arranged such that the first field of view and the second field of view overlap.

15. The method of claim 10, further comprising:
approximating a spherical image plane corresponding to the ball lens with a polyhedron having a plurality of surfaces; and
placing each image sensor of the array of image sensors on one of the plurality of surfaces of the polyhedron.

16. The method of claim 10, further comprising:
forming the array of sensors and the array of relay lenses around the ball lens, wherein each sensor of the array of sensors is paired with each relay lens in the array of relay lenses and wherein a gap is formed between adjacent pairs of sensors and relay lens; and
detecting light passing through the gap on one hemisphere to form an image on an image sensor located on an opposing hemisphere.

17. The method of claim 10, further comprising using the processor to:
transform each of the plurality of images from a RGB color space to a YUV color space, wherein the YUV color space includes a luminance component and a chrominance component;
deconvolve the luminance component of each of the transformed images;
transform each of the deconvolved images from the YUV color space to the RGB color space;
apply a noise reduction function to the images to suppress deblurring artifacts; and
stitch the images to generate the gigapixel image.

* * * * *